US010094283B2

(12) United States Patent
Ertas et al.

(10) Patent No.: US 10,094,283 B2
(45) Date of Patent: Oct. 9, 2018

(54) DIFFERENTIAL GAS BEARING FOR AIRCRAFT ENGINES

(71) Applicant: GENERAL ELECTRIC COMPANY, Schenectady, NY (US)

(72) Inventors: Bugra Han Ertas, Niskayuna, NY (US); Daniel Alan Niergarth, Cincinnati, OH (US); Brandon Wayne Miller, Liberty Township, OH (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 342 days.

(21) Appl. No.: 14/924,888

(22) Filed: Oct. 28, 2015

(65) Prior Publication Data
US 2017/0122205 A1     May 4, 2017

(51) Int. Cl.
| F02C 7/06 | (2006.01) |
| F16C 32/06 | (2006.01) |
| F16C 17/02 | (2006.01) |
| F16C 33/10 | (2006.01) |
| F01D 25/22 | (2006.01) |
| F02K 3/06 | (2006.01) |

(52) U.S. Cl.
CPC ............... *F02C 7/06* (2013.01); *F01D 25/22* (2013.01); *F02K 3/06* (2013.01); *F16C 17/028* (2013.01); *F16C 32/0607* (2013.01); *F16C 32/0625* (2013.01); *F16C 33/101* (2013.01); *F05D 2230/90* (2013.01); *F05D 2240/50* (2013.01); *F05D 2240/53* (2013.01); *F05D 2240/61* (2013.01); *F16C 2360/23* (2013.01)

(58) Field of Classification Search
CPC ............... F01D 25/166; F05D 2240/53; F05D 2240/61; F16C 32/0625; F16C 17/028
See application file for complete search history.

(56) References Cited

U.S. PATENT DOCUMENTS

| 2,602,632 A | * | 7/1952 | Serduke | ................. F01D 25/22 384/114 |
| 3,514,943 A | * | 6/1970 | Britt | ....................... F01D 25/18 184/6.4 |
| 3,844,110 A | * | 10/1974 | Widlansky | ................ F02C 7/06 60/39.08 |
| 4,005,914 A | * | 2/1977 | Newman | ............... F16C 17/024 384/103 |
| 4,332,427 A | * | 6/1982 | Sargent | ................ F01D 25/164 384/100 |

(Continued)

OTHER PUBLICATIONS

Huageng Luo et al.,"Synthesized Synchronous Sampling Technique for Differential Bearing Damage Detection", Journal of Engineering for Gas Turbines and Power, vol. 132, Issue: 7, pp. 8, Apr. 7, 2010.

*Primary Examiner* — Ninh H Nguyen
*Assistant Examiner* — Jason Davis
(74) *Attorney, Agent, or Firm* — GE Global Patent Operation; Nitin Joshi

(57) ABSTRACT

Embodiments of a gas bearing for aircraft engines are provided herein. In some embodiments, a gas bearing may include a first shaft; a second shaft disposed concentrically about the first shaft; and a protrusion extending from at least one of an inner surface of the first shaft or the outer surface of the second shaft to form a gap between the first shaft and the second shaft.

17 Claims, 4 Drawing Sheets

(56) References Cited

U.S. PATENT DOCUMENTS

| | | | |
|---|---|---|---|
| 4,427,309 A * | 1/1984 | Blake | F01D 25/166 |
| | | | 384/286 |
| 6,846,158 B2 | 1/2005 | Hull | |
| 8,083,413 B2 | 12/2011 | Ertas | |
| 8,191,352 B2 | 6/2012 | Schilling | |
| 8,511,061 B1 | 8/2013 | Merry et al. | |
| 8,511,986 B2 | 8/2013 | Alvanos et al. | |
| 8,974,344 B2 | 3/2015 | McCune et al. | |
| 9,638,059 B2 * | 5/2017 | Becker | F01D 25/16 |
| 2009/0081039 A1 * | 3/2009 | McCune | F02C 7/04 |
| | | | 415/214.1 |
| 2014/0271135 A1 | 9/2014 | Sheridan et al. | |
| 2015/0104123 A1 | 4/2015 | Ertas et al. | |

* cited by examiner

DIFFERENTIAL GAS BEARING FOR AIRCRAFT ENGINES

BACKGROUND

The field of the disclosure relates generally to gas bearings, and more particularly, to gas bearings for turbine engines.

The inventors have observed that in conventional turbine engine configurations separate components coupled to a common shaft may require different rotational speeds to perform a desired function. For example, a turbine may have a required rotational speed that is significantly higher that a required rotational speed of a fan. To accommodate for this difference in speed a gearbox may be utilized between the fan and low pressure turbine to allow each of the components to operate at different speeds. However, when operating the low pressure turbine rotor system at higher speeds enabled by the presence of the gearbox the low pressure turbine rotor will most likely need to operate at supercritical speeds. Operating above this speed may increase shaft bending stresses and dynamic bearing loads, which may result in excessive wear, or premature failure of components of the engine. The inventors have observed that such negative effects may be compensated for by utilizing a shaft having a higher stiffness. However, to achieve the requisite stiffness a prohibitive increase in diameter and weight of the shaft would be required.

Therefore, the inventors have provided a differential gas bearing for turbine engines.

BRIEF DESCRIPTION

Embodiments of a gas bearing for aircraft engines are provided herein.

In some embodiments, a gas bearing may include a first shaft; a second shaft disposed concentrically about the first shaft; and a protrusion extending from at least one of an inner surface of the second shaft or the outer surface of the first shaft to form a gap between the first shaft and the second shaft.

In some embodiments, a gas turbine engine may include: a fan having a fan shaft; a first shaft rotatably coupling a first compressor to a second turbine; a gear box rotatably coupling the first shaft to the fan shaft; a second shaft disposed concentrically about the first shaft and coupling a first turbine to a second compressor; a gas bearing, comprising: the first shaft; the second shaft; and a protrusion extending from at least one of an inner surface of the second shaft or the outer surface of the first shaft to form a gap between the first shaft and the second shaft.

The foregoing and other features of embodiments of the present invention will be further understood with reference to the drawings and detailed description.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Embodiments of a gas bearing are provided herein. In at least some embodiments, the inventive bearing may advantageously utilize one or more surfaces of concentrically disposed shafts within a turbine engine to form a gas bearing that functions to mitigate or reduce vibration amplitudes that would otherwise result from operating the shafts at higher rotational speeds, thereby allowing the shafts to operate at higher speeds while reducing shaft stresses and reducing or eliminating wear or instances of failure caused by such stresses.

Figure 1:
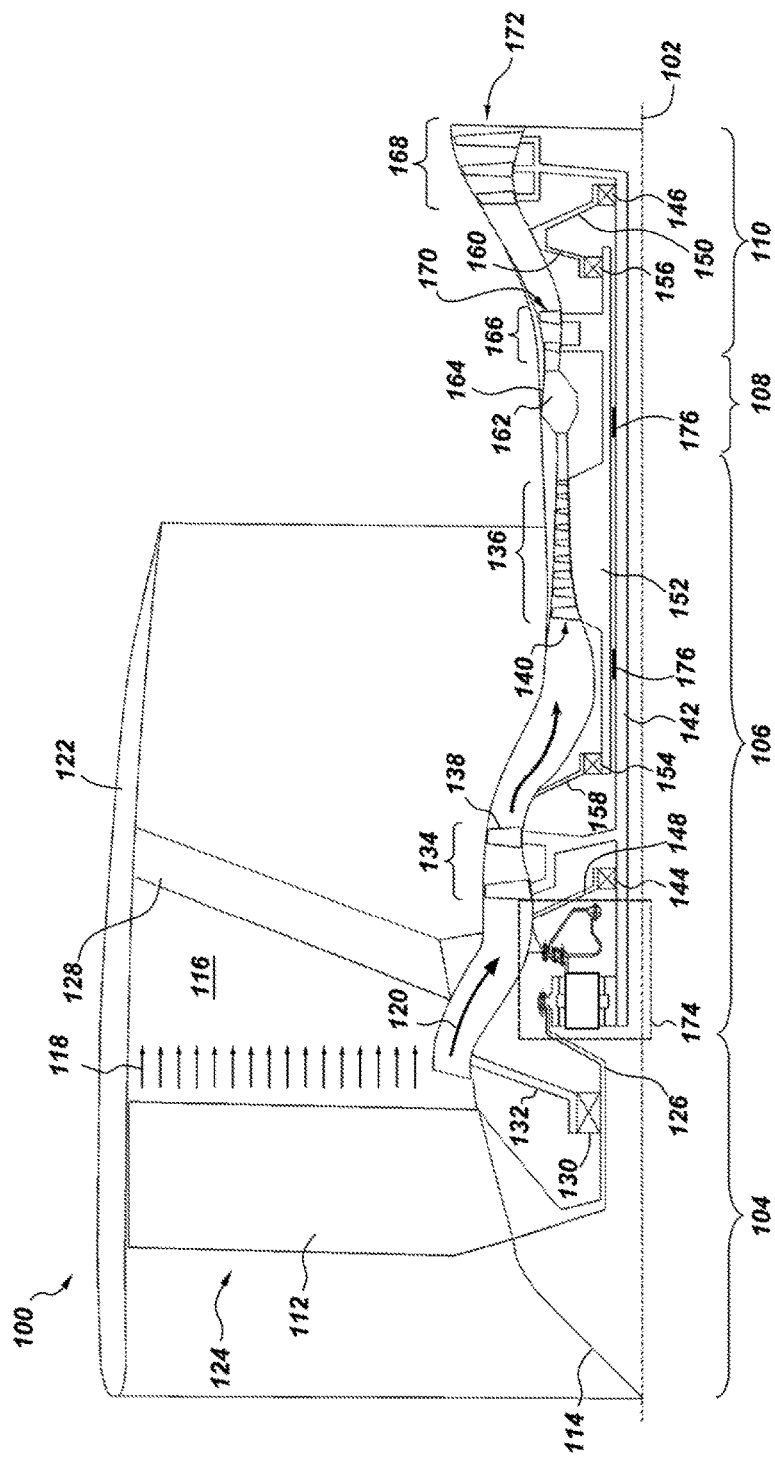
FIG. 1 is a partial schematic view of an engine in accordance with some embodiments of the present invention.

FIG. 1 is a partial cross sectional view of an engine 100. In the exemplary embodiment, the engine 100 is a gas turbine engine suitable for use in, for example, aviation or marine applications. Alternatively, the engine 100 may be any other turbine engine and/or turbomachine, including, without limitation, a steam turbine engine, a centrifugal compressor, and a turbocharger. Although only a portion is shown, it is to be understood that the engine 100 may be annular in form, for example about an axis 102. In some embodiments, the engine 100 may generally comprise an air intake section 104, compression section 106, combustion section 108 and turbine section 110.

The air intake section 104 generally comprises a fan 124 having a plurality of fan blades 112 coupled to a hub 114 and a rotatable fan shaft 126. One or more bearings 130 may be disposed between a stationary support 132 and the fan shaft 126 to facilitate rotation of the fan shaft 126 and/or dampen vibrational energy imparted on the fan shaft 126 during operation of the engine 100. The one or more bearings may be any type of bearings suitable for use within the engine 100, for example, such as gas bearings, journal bearings, or the like. In some embodiments, a casing 122 may be disposed about the fan 124 and at least a portion of the engine 100, thereby forming a passage 116 for a flow of air (e.g., bypass air) driven by the fan 124, such as indicated by arrows 118. In such embodiments, the casing 122 may be at least partially supported by a plurality of struts (one strut 128 shown). In operation, the fan 124 draws air into the engine 100, directing at least a portion of the air through the passage 116 and at least a portion of the air into the compressor section 106.

The compression section 106 is mechanically and fluidly coupled to the fan section 104 and generally comprises one or more compressors, for example, such as a first compressor (low pressure compressor) 134 and second compressor 136 (high pressure compressor), as shown in the figure.

The first compressor 134 receives the directed air from the air intake section 104 and compresses the air via a plurality of compressor blades, vanes or stages (collectively shown at 138). In some embodiments, the compressor blades 138 may be coupled to a first shaft (low pressure turbine (LPT) shaft) 142 to drive rotation of the compressor blades 138. One or more bearings (a first, or forward end low pressure turbine bearing 144 and a second, or aft end low pressure turbine bearing 146 shown) may be disposed between one or more stationary supports 148, 150 and the LPT shaft 142 to facilitate rotation of the LPT shaft 142 and/or dampen vibrational energy imparted on the LPT shaft 142 during operation of the engine 100. The one or more bearings may be any type of bearings suitable for use within the engine 100, for example, such as gas bearings, journal bearings or the like.

The second compressor 136 receives the compressed air from the first compressor 134 and further compresses the air via a plurality of compressor blades or stages (collectively shown at 140). In some embodiments, the compressor blades 140 may be coupled to a high pressure turbine (HPT) shaft (core shaft) 152 to drive rotation of the compressor blades 140. One or more bearings (a third, or forward end high pressure turbine bearing, 154 and a third, or aft end high pressure turbine bearing 156 shown) may be disposed between one or more stationary supports 158, 160 and the HPT shaft 152 to facilitate rotation of the HPT shaft 152 and/or dampen vibrational energy imparted on the HPT shaft 152 during operation of the engine 100. The one or more bearings may be any type of bearings suitable for use within the engine 100, for example, such as gas bearings, journal bearings or the like.

Although only a limited number of compressors and limited number of stages for each compressor are shown in the figure, any number of compressors and/or compressor stages may be present to facilitate suitable operation of the engine 100 for a desired application.

The combustion section 108 receives the compressed air from the second compressor 136, mixes the compressed air with a fuel, and facilitates an ignition of the fuel/air mixture. The combustion section 108 generally includes a combustor 162 having a combustion chamber 164 mechanically and fluidly coupled to the compression section 106 and turbine section 110. The combustor 162 may be any type of suitable combustor known in the art and may include any components (e.g., cowls, swirlers, nozzles, igniters, fuel injectors, or the like) required to facilitate the ignition of the fuel/air mixture as described above.

The turbine section 110 is mechanically and fluidly coupled to the combustion section 108 and generally comprises one or more turbines, for example, such as a first turbine (high pressure turbine) 166 and second turbine (low pressure turbine) 168 as shown in the figure. Although only a limited number of turbines and limited number of stages for each turbine are shown in the figure, any number of turbines and/or turbine stages may be present to facilitate suitable operation of the engine 100 for a desired application.

In some embodiments, the first turbine 166 and second turbine 168 each may comprise a plurality of turbine blades and turbine nozzles, or stages (collectively shown at 170 and 172). With respect to the first turbine 166, the turbine blades 170 may be coupled to the HPT shaft 152, which is coupled to the second compressor 136, as described above. In operation of such embodiments, the first turbine 166 receives the heated air from the combustion section 108 and coverts at least a portion of the thermal energy (e.g., provided by ignition of the fuel/air mixture in the combustion chamber 164) into mechanical rotational energy via the plurality of turbine blades 170. The rotation of the turbine blades 170 causes the HPT shaft 152 to rotate, thereby causing the compressor blades 140 of the second compressor 136 to rotate.

With respect to the second turbine 168, the turbine blades 172 may be coupled to the LPT shaft 142, which is coupled to the first compressor 134, as described above. In some embodiments, the LPT shaft 142 may also be coupled to the fan shaft 126, for example, such as shown in FIG. 1. In operation, the second turbine 168 receives the heated air from the first turbine 166 and coverts at least another portion of the thermal energy into mechanical rotational energy via the plurality of turbine blades 172. The rotation of the turbine blades 172 causes the second shaft 142 and the fan shaft 126 to rotate, thereby causing the compressor blades 138 of the second compressor 134 and the fan 124 to rotate.

Although described above in the context of an engine having a two spool configuration (e.g., a high pressure (HP) spool comprising a HP turbine and HP compressor and low pressure (LP) spool comprising a LP turbine and LP compressor), it is to be understood that the engine may have a three spool configuration having an intermediate spool (e.g., an intermediate spool comprising an intermediate turbine and intermediate compressor).

The inventors have observed that in conventional engine configurations (e.g., such as shown in FIG. 1) separate components coupled to a common shaft may require different rotational speeds to perform a desired function. For example, the second turbine 168 may have a required rotational speed that is significantly higher that a required rotational speed of the fan 124. For example, in some embodiments, the second turbine 168 may have a rotational speed requirement of about 11,000 revolutions per minute (rpm) and the fan 124 may have a rotational speed requirement of about 2,400 to about 3000 rpm. To accommodate for this difference in speed, in some embodiments, a gearbox 174 may be utilized to allow each of the components (e.g., the low pressure/second turbine 168 and fan 124) to operate at different speeds. In such embodiments, the gearbox 174 may couple the LPT shaft 142 to the fan shaft 126, for example, such as shown in FIG. 1. The gearbox 174 may be any type of gearbox suitable to facilitate coupling the LPT shaft 142 to the fan shaft 126 while allowing each of the second turbine 168 and fan 124 to operate at a desired speed. For example, in some embodiments, the gearbox 174 may be a reduction gearbox. Utilizing a reduction gearbox may enable the comparatively higher speed operation of the second turbine 168 while maintaining fan speeds sufficient to provide for increased air bypass ratios, thereby allowing for efficient operation of the engine 100. Moreover, utilizing a reduction gearbox may allow for a reduction in turbine stages that would otherwise be present (e.g., in direct drive engine configurations), thereby providing a reduction in weight and complexity of the engine.

The inventors have further observed that when operating at speeds enabled by the presence of the gearbox 174, the LPT shaft 142 may rotate at or above a speed (e.g., $3^{rd}$ critical speed) that may result in an undesirable flexion or vibration of the LPT shaft 142. Without intending to be bound by theory, the inventors believe that, when operating at or above such a speed (e.g., "super critical") vibrational nodes proximate the end bearing locations (e.g., the forward end low pressure turbine bearing 144 and/or aft end low pressure turbine bearing 146 described above) may be present, thereby generating a vibration mode of the LPT shaft 142 that may result in significant bending of the shaft and displacements proximate a center of the LPT shaft 142. As such, traversing through such a speed may increase shaft stresses and transient higher dynamic bearing loads, which may result in excessive wear, or premature failure of components of the engine 100.

As such, in some embodiments, the engine 100 may comprise one or more gas bearings (two gas bearings 176 shown) disposed along the LPT shaft 142. The inventors have observed that utilizing the one or more gas bearings may mitigate or reduce vibration amplitudes that would otherwise result from the above described rotational speed of the LPT shaft 142, thereby reducing shaft stresses and reducing or eliminating wear or instances of failure caused by such stresses. The gas bearings 176 may be disposed at any location along the LPT shaft 142 suitable to provide one or more of the benefits as described herein. For example, in some embodiments, the gas bearings 176 may be positioned at any location between about 25% to about 75% of the axial length of the LPT shaft 142 as measured from the bearing 154.

Figure 2:
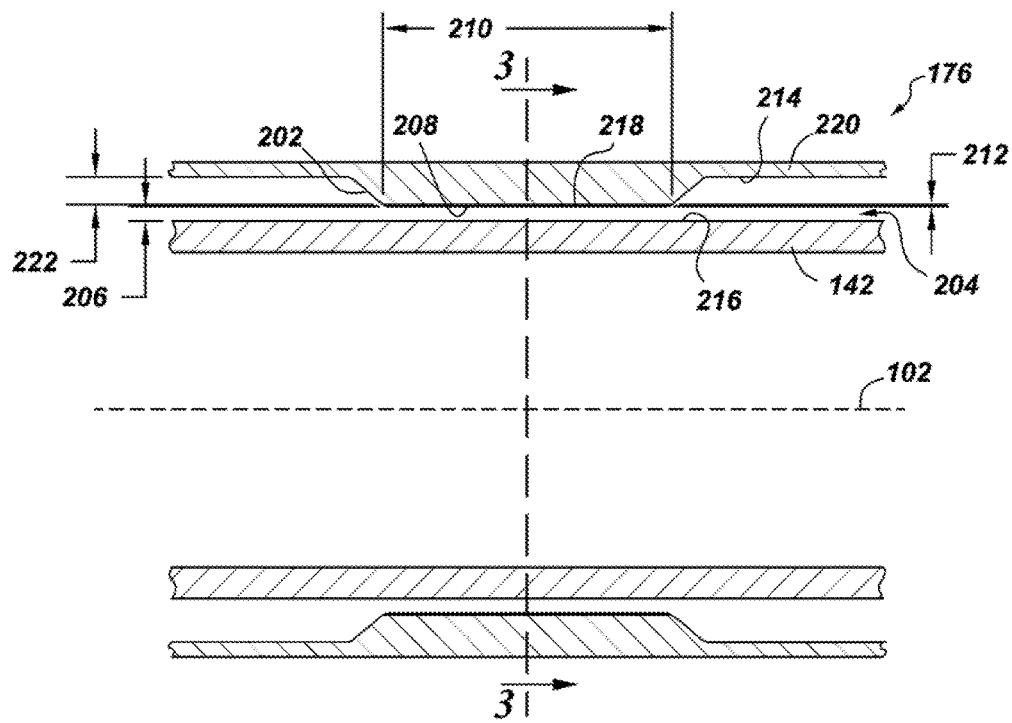
FIG. 2 is an cross-sectional view of an exemplary gas bearing in accordance with some embodiments of the present invention.

The gas bearing(s) 176 may be any type of gas bearing (e.g., a differential gas bearing) suitable to reduce or eliminate the aforementioned flexion of the LPT shaft 142 when operating at increased rotational speeds. For example, an exemplary gas bearing 176 is shown in FIG. 2. As shown in the figure, in some embodiments the gas bearing 176 may generally comprise at least a portion of the LPT shaft 142 and a portion of a second shaft 220. The second shaft 220 may be any shaft of the engine, for example, the HPT shaft 152 described above or, in embodiments where the engine comprises a three spool configuration, an intermediate shaft). In such embodiments, the second shaft 220 may include a protrusion 202 extending from an outer surface 214 of the second shaft 220 towards an inner surface 216 of the LPT shaft 142. The protrusion 202 may be a separate component coupled to the second shaft 220, or alternatively be an integrally formed part of the second shaft 220. In addition, the protrusion 202 may be fabricated from the same, or alternatively, a different material than that of the second shaft 220. When present, the protrusion 202 provides a gap 204 between the outer surface 214 of the second shaft 220 and the inner surface 216 of the LPT shaft 142 having a thickness 206 sufficient to generate a separation pressure through a relative surface velocity between the LPT shaft 142 and the second shaft 220, thereby increasing a load capacity of the LPT shaft 142. In such configurations, the gas bearing 176 may function as a hydrodynamic bearing wherein the LPT shaft 142 is a journal.

The protrusion 202 and/or gap 204 may have any dimensions suitable to provide the above discussed separation pressure between the LPT shaft 142 and the second shaft 220. For example, in some embodiments, the protrusion 202 may have a length 210 of about 2 inches to about 3 inches and a thickness 222 of about 0.02 inches to about 0.05 inches. In some embodiments, the gap 204 may have a thickness 206 of about 0.002 inches to about 0.01 inches.

In some embodiments, the gas bearing 176 may comprise a coating 208 disposed on one or more surfaces, such as the inner surface 214 of the second shaft 220 and/or the outer surface 216 of the LPT shaft 142. When present, the coating 208 may function to prevent wear and provide lubrication in instances of incidental or intermittent contact between the second shaft 220 and the LPT shaft 142. The coating 208 may be disposed at any location across the second shaft 220 and the LPT shaft 142 that may be subject to such contact, for example, such as on a surface 218 of the protrusion 202 such as shown in FIG. 2.

The coating 208 may be any type of coating suitable to provide such wear resistance and/or lubrication. For example, in some embodiments, the coating may comprise high temperature solid lubricant coatings, or the like. In addition, the coating 208 may be of any suitable thickness 212, for example, about 0.0005 inches to about 0.0015 inches. Moreover, the coating 208 may be fabricated via any method suitable for the particular composition and/or thickness of the coating 208, for example, such as deposition, plasma spray, or the like.

Figure 3:
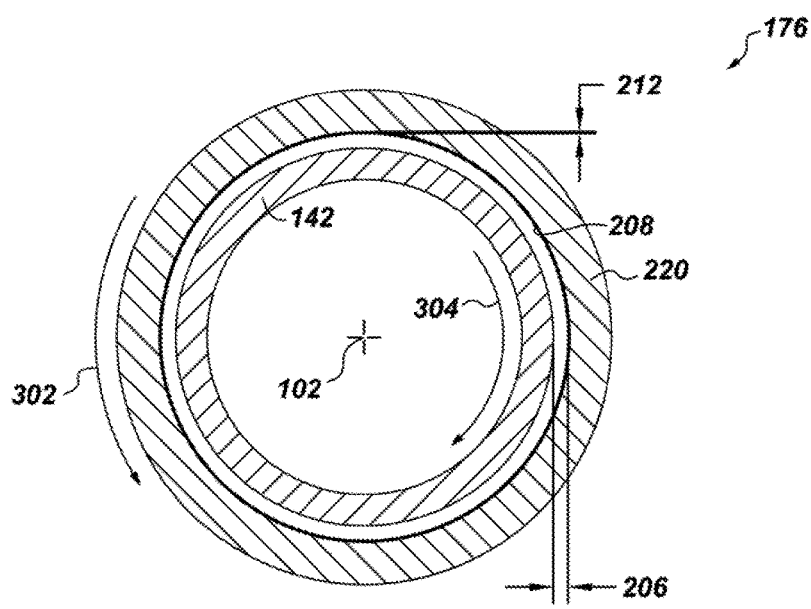
FIG. 3 is a cross-sectional view of the exemplary gas bearing shown in FIG. 2 in accordance with some embodiments of the present invention.

In some embodiments, the LPT shaft 142 and second shaft 220 may be counter-rotating about the axis 102, such as indicated by arrows 302, 304 in FIG. 3. The inventors have observed that counter-rotating the LPT shaft 142 and second shaft 220 (e.g., such as in the configuration shown in FIGS. 2 and 3) may provide a pressure between the shafts sufficient to produce robust separation pressures, thereby increasing load capacity of the shafts.

Figure 4:
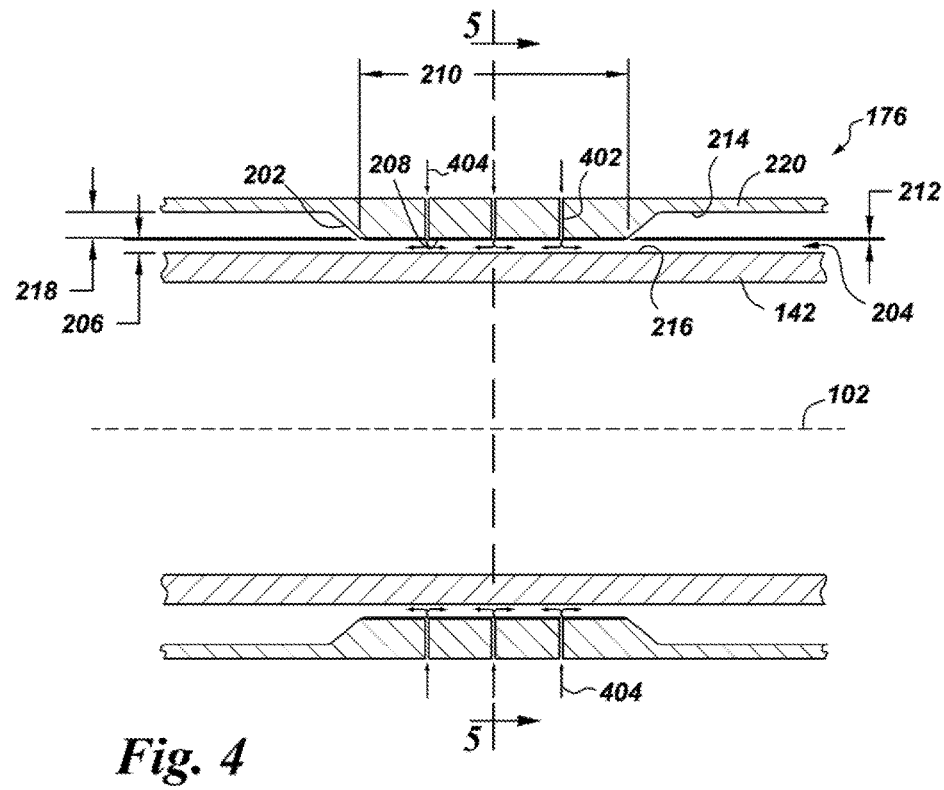
FIG. 4 is an cross-sectional view of an exemplary gas bearing in accordance with some embodiments of the present invention.

Referring to FIG. 4, in some embodiments, the bearing 176 may comprise a plurality of through holes (inlets) 402 formed in the second shaft 220 and fluidly coupled to the gap 204. In such embodiments, a gas may be provided to the gap 204 via the inlets 402 (air flow indicated by arrows 404); thereby pressurizing the gap 204 and creating a separation pressure between the LPT shaft 142 and the second shaft 220. The inventors have observed that pressurizing the gap 204 in such a manner may function to increase a stiffness of the system (i.e., the LPT shaft 142 and the second shaft 220) by creating differential supports between the shafts. Moreover, such a configuration may push the third critical speed out of the engine operating speed range and enable operation below the third critical speed.

The gas may be any type of gas suitable to provide the above described pressurization. For example, in some embodiments the gas may comprise air, CO2, Methane, or the like. In addition, the gas may be provided to the inlets 402 via any suitable means. For example, in some embodiments, at least a portion of the bypass air (e.g., air flowing through the passage 116 described above) may be redirected to the inlets via one or more conduits (shown in phantom at 502).

Figure 5:
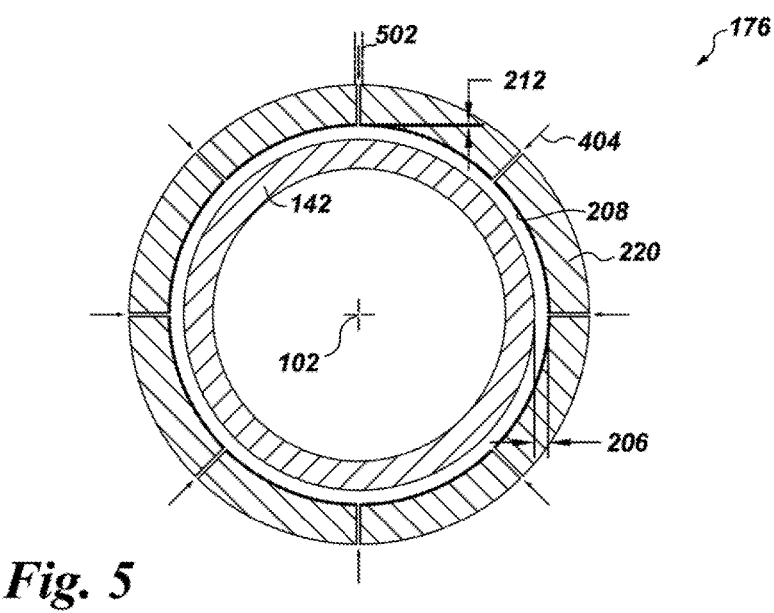
FIG. 5 is a cross-sectional view of the exemplary gas bearing shown in FIG. 4 in accordance with some embodiments of the present invention.
Figure 6:
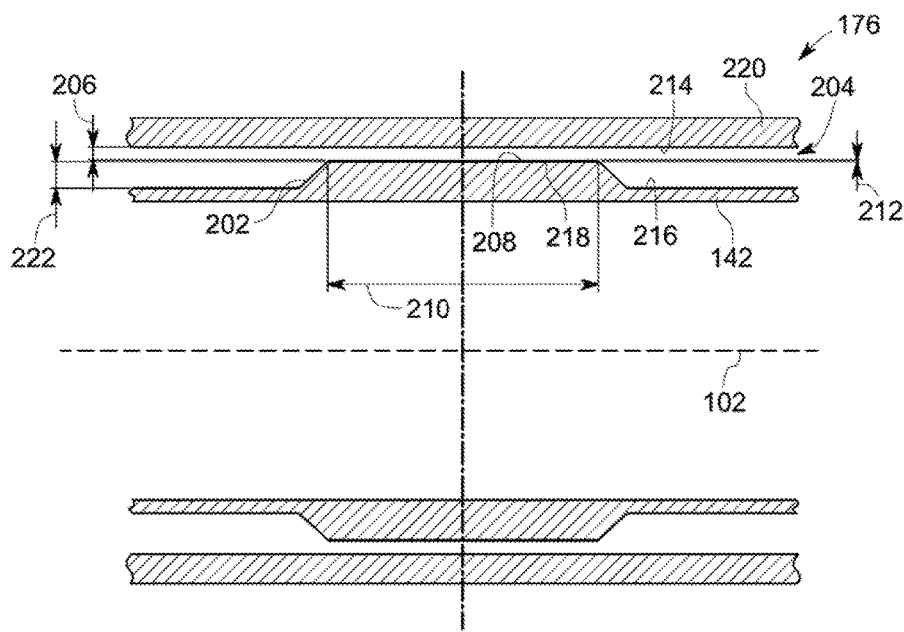
FIG. 6 is a cross-sectional view of an exemplary gas bearing in accordance with some embodiments of the present invention.
Figure 7:
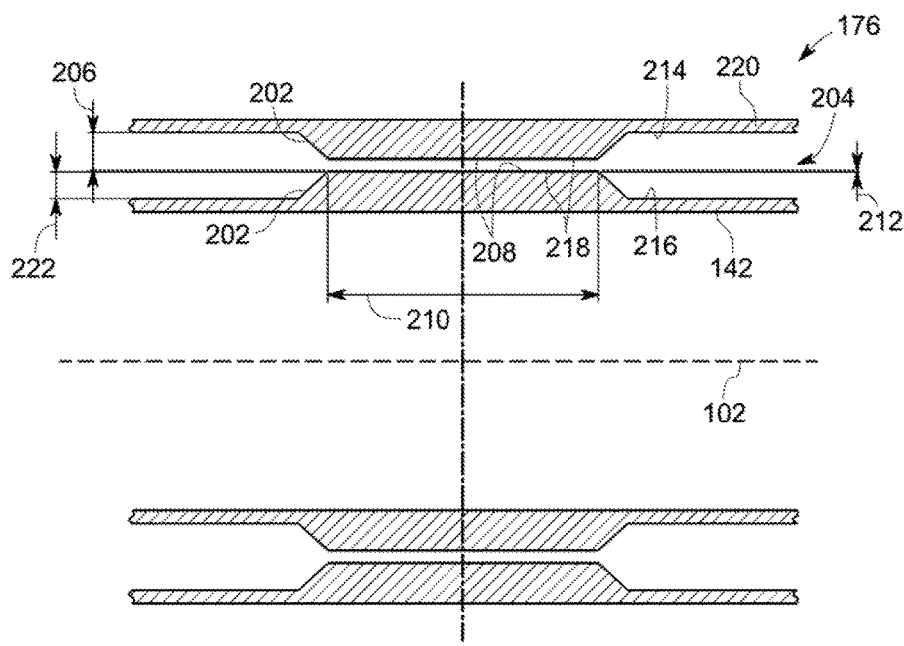
FIG. 7 is a cross-sectional view of the exemplary gas bearing shown in FIG. 6 in accordance with some embodiments of the present invention.

Although shown in rows of three in the figure, any number of inlets 404 suitable to provide a sufficient amount of gas to the gap 204 may be utilized. Moreover, the inlets 404 may be disposed in any manner and/or distribution about the second shaft 220 suitable to provide a sufficient separation force between the LPT shaft 142 and second shaft 220. For example, in some embodiments the inlets 404 may be symmetrically disposed or evenly spaced about the second shaft 220 as shown in FIG. 5.

Thus, embodiments of a gas bearing have been provided herein. Ranges disclosed herein are inclusive and combinable (e.g., ranges of "about 2 mils and about 100 mils", is inclusive of the endpoints and all intermediate values of the ranges of "about 2 mils and about 100 mils," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "some embodiments", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A gas bearing for a turbine engine comprising:
   a first shaft;
   a second shaft disposed concentrically about the first shaft; and
   a protrusion extending from at least one of an inner surface of the second shaft or an outer surface of the first shaft to form a gap between the first shaft and the second shaft,
   wherein the second shaft comprises a plurality of through holes, wherein the through holes are fluidly coupled to the gap, and wherein the plurality of through holes are configured to allow a flow of air to the gap to pressurize the gap.

2. The gas bearing of claim 1, further comprising:
   a coating disposed on at least a portion of the protrusion.

3. The gas bearing of claim 2, wherein the coating is a high temperature solid lubricant coating.

4. The gas bearing of claim 1, wherein the first shaft is a low pressure turbine shaft of the turbine engine and wherein the second shaft is a high pressure turbine shaft or an intermediate turbine shaft of the turbine engine.

5. The gas bearing of claim 1, wherein the first shaft and second shaft are configured to counter rotate.

6. The gas bearing of claim 1, wherein the gap has a thickness of about 0.002 inches to about 0.01 inches.

7. The gas bearing of claim 1, wherein the protrusion is disposed at about 25% to about 75% of an axial length of the first shaft.

8. The gas bearing of claim 1, wherein the protrusion has a length of about 2 inches to about 3 inches.

9. The gas bearing of claim 1, wherein the protrusion has a thickness of about 0.02 inches to about 0.05 inches.

10. The gas bearing of claim 1, wherein the protrusion is of rectangular shape with one or more tapered edges.

11. A gas turbine engine, comprising:
    a fan having a fan shaft;
    a first shaft rotatably coupling a first compressor to a second turbine;
    a gear box rotatably coupling the first shaft to the fan shaft;
    a second shaft disposed concentrically about the first shaft and coupling a first turbine to a second compressor;
    a gas bearing, comprising:
       the first shaft;
       the second shaft; and
       a protrusion extending from at least one of an inner surface of the second shaft or an outer surface of the first shaft to form a gap between the first shaft and the second shaft;
    wherein a coating is disposed on at least a portion of the protrusion, and
    wherein the second shaft comprises a plurality of through holes, wherein the through holes are fluidly coupled to the gap, and wherein the plurality of through holes configured to allow a flow of air to the gap to pressurize the gap.

12. The gas turbine engine of claim 11, wherein the first shaft is a low pressure turbine shaft of the turbine engine, and wherein the second shaft is a high pressure turbine shaft or an intermediate turbine shaft of the turbine engine.

13. The gas turbine engine of claim 11, wherein the first shaft and the second shaft are configured to counter rotate.

14. The gas turbine engine of claim 11, wherein the gap has a thickness of about 0.002 inches to about 0.01 inches.

15. The gas turbine engine of claim 11, wherein the protrusion is disposed at about 25% to about 75% of an axial length of the first shaft.

16. The gas turbine engine of claim 11, wherein the protrusion has a length of about 2 inches to about 3 inches.

17. The gas turbine engine of claim 11, wherein the protrusion has a thickness of about 0.02 inches to about 0.05 inches.

* * * * *